United States Patent [19]

Ito et al.

[11] Patent Number: 4,652,121

[45] Date of Patent: Mar. 24, 1987

[54] MOVING BODY MEASURING INSTRUMENT

[75] Inventors: Sho Ito, Kanagawa; Hiroshi Horikoshi, Gumma; Kumio Kasahara, Kanagawa, all of Japan

[73] Assignee: Mitsubishi Denki Kabushiki Kaisha, Japan

[21] Appl. No.: 580,889

[22] Filed: Feb. 16, 1984

[30] Foreign Application Priority Data

Feb. 17, 1983 [JP] Japan ............................. 58-27133

[51] Int. Cl.⁴ .................... G01P 3/36; A63B 69/40
[52] U.S. Cl. ................... 356/28; 273/26 R; 273/26 B
[58] Field of Search ............ 356/28; 273/25, 26 R, 273/26 B, 181 H, 186 R, DIG. 28

[56] References Cited

U.S. PATENT DOCUMENTS

| | | |
|---|---|---|
| 3,117,451 | 1/1964 | De La Verne Ray et al. ... 273/26 R |
| 4,150,825 | 4/1979 | Wilson ............................. 273/181 H |
| 4,254,956 | 3/1981 | Rusnak ............................ 273/181 H |
| 4,306,722 | 12/1981 | Rusnak ............................ 273/186 R |

Primary Examiner—Stephen C. Buczinski
Assistant Examiner—Melissa Koltak
Attorney, Agent, or Firm—Bernard, Rothwell & Brown

[57] ABSTRACT

A moving body measuring instrument is disclosed which projects, from predetermined locations thereof, a plurality of beams of light at predetermined angles into a same plane, receives, at predetermined locations thereof, the beams reflected from a moving body as it moves to intersect with the beams, calculates parameters of the motion of the moving body in accordance with predetermined operation from timing data of the beams received, and indicates the results of the calculations on an indicator. The moving body has a light reflective member provided thereon which reflects a beam for measurement toward a direction incident thereto irrespective of its incident angle, and substantially same locations are provided at which beams are projected and received.

8 Claims, 6 Drawing Figures

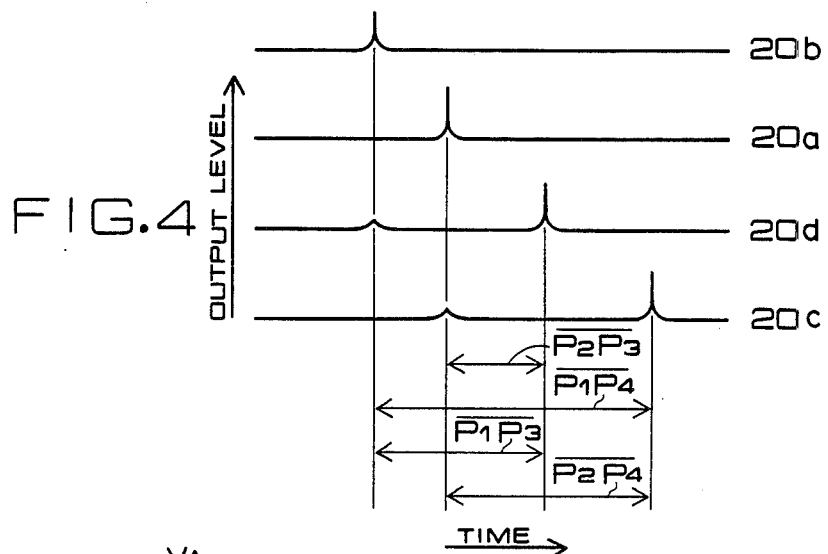
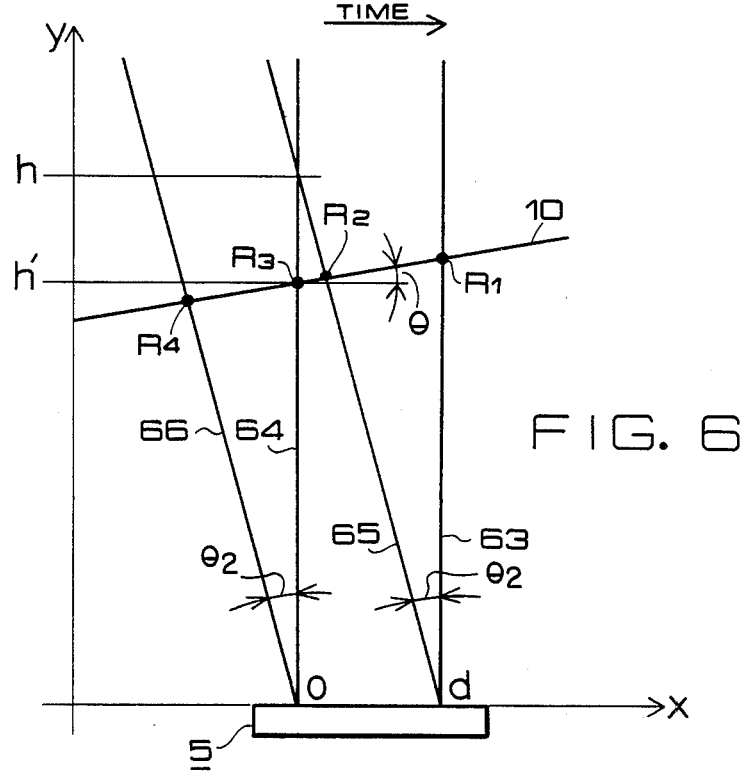

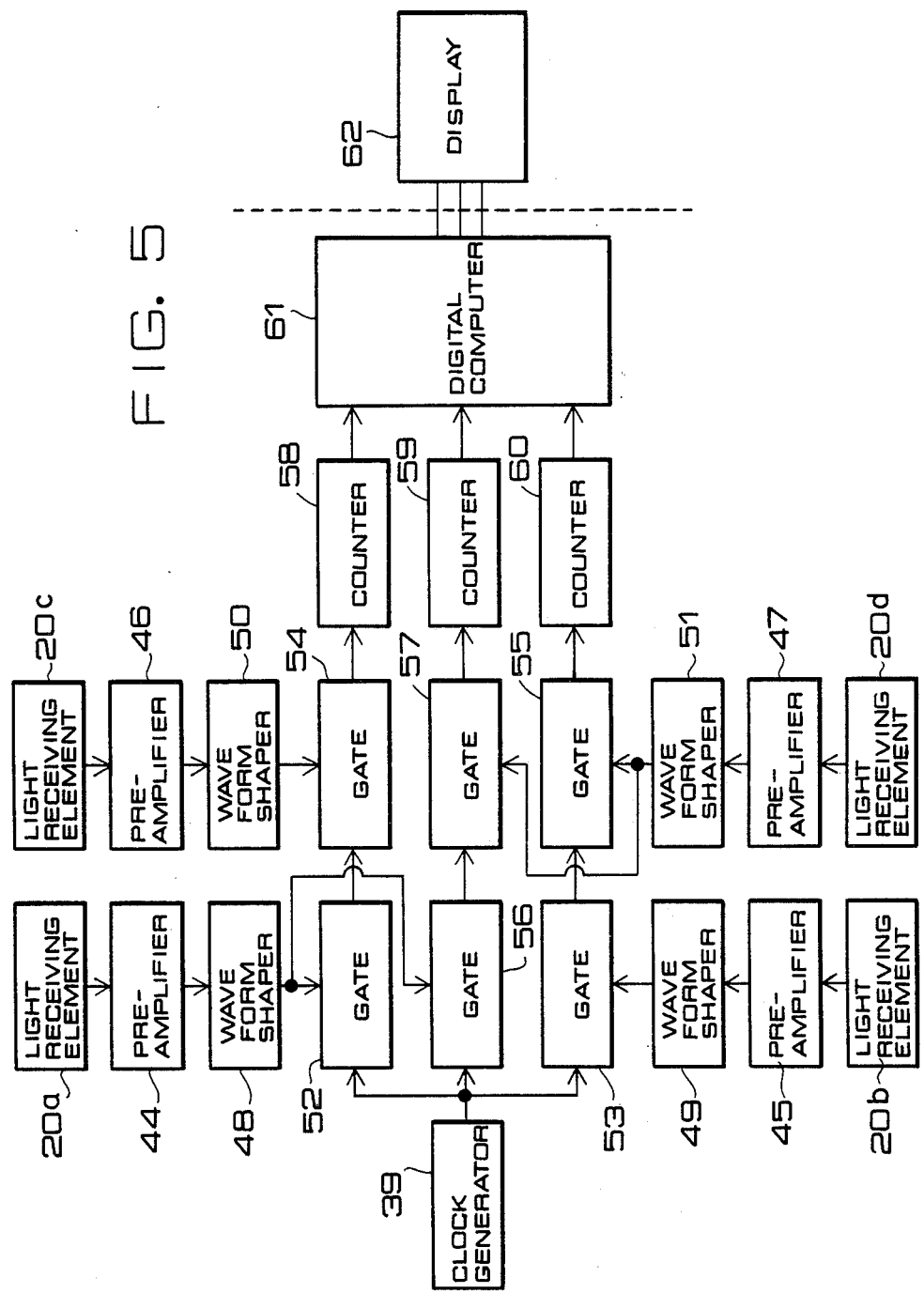

MOVING BODY MEASURING INSTRUMENT

BACKGROUND OF THE INVENTION

This invention relates to a measuring instrument for measuring parameters of a motion of a moving body, and more particularly to a measuring instrument for measuring parameters of a motion of a baseball bat during swinging without contacting therewith.

Conventionally, when a baseball player practices batting, photographs are successively taken of a batter who swings a bat, using, for example, a Storobo camera, and a locus of the baseball bat is measured from the photographs to calculate a height and inclination of a plane, a velocity, and so on, of the swing. But, such a technique cannot assure rapid and accurate measurement, and thus it only provides a poor training advantage to the player.

SUMMARY OF THE INVENTION

Accordingly, it is an object of the present invention to provide a measuring instrument which can measure a motion of a moving body in a short period of time without contacting with the moving body electronically and/or mechanically.

It is another object of the invention to provide a measuring instrument which can calculate various parameters from data regarding a motion of a moving body to be measured in accordance with predetermined operations.

According to the present invention, there is provided a moving body measuring instrument comprising:

an optical system for projecting beams of light emitted from at least one light source into a same plane;

light receiving means for receiving said beams reflected from an object body having a reflective surface of a recurrent reflective material when said object body moves in a direction intersecting with said beams;

operational means connected to the output of said light receiving means for calculating physical parameters of a motion of said object body; and an indicator means for indicating said parameters calculated by said operational means;

said beams including first and second groups of beams of light which are parallel to and spaced apart each other and ones of said beams of said first and second groups being projected at such angles so as to intersect with each other at a predetermined height.

BRIEF DESCRIPTION OF THE DRAWINGS

FIG. 4 is a timing chart of output signals of light receiving elements in the sensor section shown in FIG. 1;

FIG. 5 is a block diagram of a signal processing circuit of a measuring instrument according to the invention; and FIG. 6 is a diagram showing relationship between the bat and the beams projected from an optical system according to another embodiment of the invention.

DESCRIPTION OF THE PREFERRED EMBODIMENTS

Figure 1:
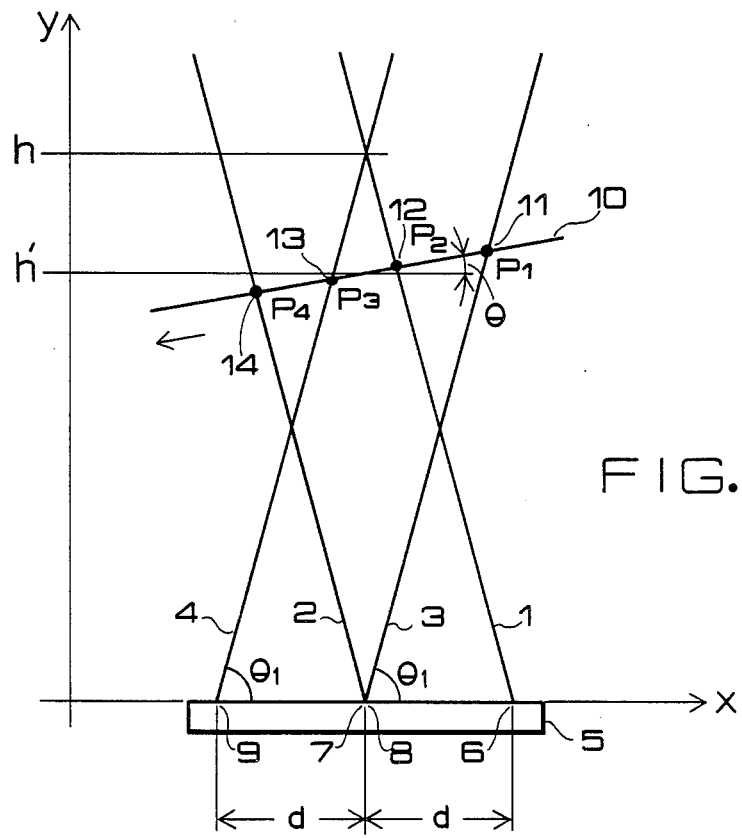
FIG. 1 is a diagram illustrating relationship between directions of beams projected from a measuring instrument according to the present invention and a locus of a swing of a baseball bat.

FIG. 1 is a diagram illustrating relationship between beams of light projected from a sensor section of a swing measuring instrument according to the present invention and a locus of a swing of a baseball bat. Referring to FIG. 1, reference numerals 1, 2, 3, and 4 each denote a path of the beam having high directivity which is preferably obtained by projection of a beam from a HeNe laser beam oscillator by way of a condensing optical system. The paths 1 and 2 are parallel to and spaced apart a distance d from between them, and the light paths 3 and 4 are also parallel to and spaced apart the distance d between them, as shown in FIG. 1, and the distance 2d is substantially the same as the length of a baseball home plate or base. A sensor section 5 has an optical system which projects such four beams. The sensor section 5 further contains therein four optical systems having fields of view substantially coaxial with the individual beams for receiving light reflected by the bat which has preferably a recurrent reflective tape suitably adhered thereto for reflecting the beams. Locations 6 to 9 respectively indicate locations on the base at which the four optical systems for projecting and receiving the beams are installed. A plane 10 which includes a locus of the bat has four intersecting points $P_1$, $P_2$, $P_3$ and $P_4$ at which it intersects with such beams.

Now, it is assumed that the bat which is swung by a player moves substantially at a constant velocity from the right to the left as indicated by an arrow. Further, in order to facilitate following descriptions, a plane which contains all of the four light paths 1 to 4 is denoted by xy, the direction along a face of the sensor section 5 is taken as the x axis, the direction perpendicular to the x axis is taken as the y axis, and a projecting point of the paths 2 and 3 is taken as the origin 0 of the coordinates. Further, it is assumed that the light paths 1 and 4 intersect with each other at a height h on the y axis and that the locus 10 has an angle $\theta$ relative to the x axis and intersects with the y axis at a height h'. Thus, using simple geometrical calculations, x and y coordinates of the intersecting points $P_1$, $P_2$, $P_3$ and $P_4$ are represented as follows:

$$P_1: \left( \frac{h'}{\frac{h}{d} - \tan\theta}, \frac{h}{d} \cdot \frac{h'}{\frac{h}{d} - \tan\theta} \right) \quad (1)$$

$$P_2: \left( \frac{h - h'}{\frac{h}{d} + \tan\theta}, h - \frac{h}{d} \cdot \frac{h - h'}{\frac{h}{d} + \tan\theta} \right) \quad (2)$$

$$P_3: \left( \frac{h' - h}{\frac{h}{d} - \tan\theta}, h + \frac{h}{d} \cdot \frac{h' - h}{\frac{h}{d} - \tan\theta} \right) \quad (3)$$

$$P_4: \left( \frac{-h'}{\frac{h}{d} + \tan\theta}, \frac{h}{d} \cdot \frac{h'}{\frac{h}{d} + \tan\theta} \right) \quad (4)$$

A ratio $r_0$ between segments $\overline{P_1P_4}$ and $\overline{P_2P_3}$ and another ratio $r_1$ between segments $\overline{P_1P_3}$ and $\overline{P_2P_4}$ are calculated using the expressions (1) to (4) above; the results are indicated by following expressions:

$$r_0 = \frac{\overline{P_2P_3}}{\overline{P_1P_4}} \qquad (5)$$

$$= \frac{h - h'}{h'}$$

$$r_1 = \frac{\overline{P_1P_3}}{\overline{P_2P_4}} \qquad (6)$$

$$= \frac{\frac{h}{d} + \tan\theta}{\frac{h}{d} - \tan\theta}$$

Here, the height h' and the angle $\theta$ which are unknown values are calculated using following expressions (7) and (8), $$h' = \frac{h}{r_0 + 1} \qquad (7)$$

$$\theta = \tan^{-1}\frac{r_1 - 1}{r_1 + 1} \cdot \frac{h}{d} \qquad (8)$$

Further, since a component of the velocity V of the swing of the bat in the direction of the x axis is the distance d between the paths 1 and 2 (or between the paths 3 and 4) divided by an elapsed time $t_1$ during the movement of the bat therebetween, it is calculated by a following expression (9), $$V = d/t_1 \qquad (9)$$

In the description above, $r_0$ and $r_1$ have been described each as a ratio between geometric segments so as to facilitate understanding. But since the assumption has been made that the bat moves a substantially a constant velocity along locus 10, it is obvious that $r_0$ can be replaced by a ratio between an interval of time the bat intersects with the path 1 and 4 and another interval of time the bat intersects with the path 3 and 2. Similarly, $r_1$ can also be replaced by a ratio between an interval of time the bat intersects with the path 3 and 4 and another interval of time the bat intersects with the path 1 and 2. Accordingly, it is understood that values which are required for determination of three parameters of the motion of the bat can be calculated from data of time at which the bat succeedingly intersects with such four beams.

Figure 2:
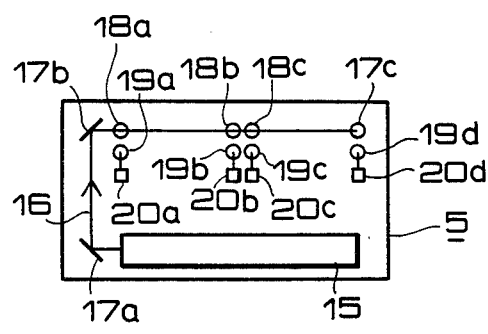
FIG. 2 is a structural diagrammatic representation showing details of a sensor section shown in FIG. 1.
Figure 3:
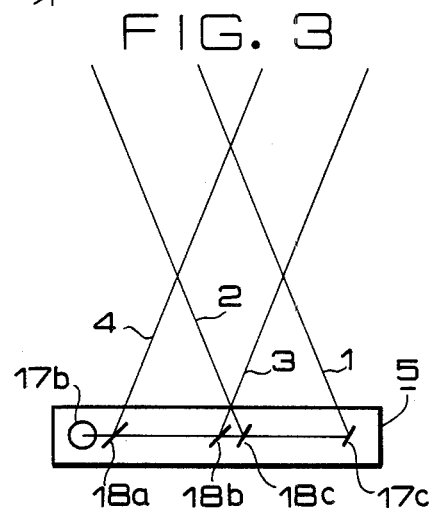
FIG. 3 is a diagram showing paths of the beams projected from an optical system of the sensor section shown in FIG. 1.

FIG. 2 is a block diagram showing the construction of the sensor section 5 including the optical systems, and FIG. 3 is a diagrammatic representation illustrating directions of beams of light projected from the sensor section. Referring to FIGS. 2 and 3, a laser beam oscillator 15 has a mixture gas of He and Ne as active material for emitting HeNe laser beams. The laser beams projected from the sensor section 5 are totally and partially reflected by total reflection mirrors 17a to 17c and half-mirrors 18a to 18c, respectively, the former are disposed on a path 16 to divert an incident beam of light at an angle of 90 degrees. Light receiving optical systems 19a to 19d each preferably include a lens or a combination of lenses for focusing reflected light from the reflective tape adhered to the bat and a reflective mirror or mirrors. The light beams which are transmitted through the optical systems 19a to 19d are converted into electric signals by means of light receiving elements 20a to 20d. Here, employed for the recurrent reflective tape may be, for example, a high intensity grade reflective sheet 2870 of a Scotch light mark which provides reflective light to its incident light passage irrespective of its incident angle. When the bat intersects with these paths and the light receiving elements 20a to 20d arranged as shown in FIG. 2, in coaxial relationship with or located adjacent to the optical systems 19a to 19d, a large signal-to-noise ratio can be attained, since the light energies other than those received from the optical systems 19a to 19d can almost be negligible as clearly seen from output signals of the elements 20a to 20d illustrated in FIG. 4.

Referring to FIG. 4, the abscissa indicates the time, and the ordinate indicates voltage levels of receiving signals from the four light receiving elements 20a to 20d. It is understood that the intervals of time between maximum levels of the output signals of the elements 20a to 20d respectively correspond to the segments $\overline{P_1P_3}$, $\overline{P_1P_4}$, $\overline{P_1P_3}$ and $\overline{P_2P_4}$. Thus, if such intervals of time are substituted into the expressions (5) and (6) to find out the ratios $r_0$ and $r_1$ respectively, and its results are further substituted into the expressions (7) and (8) respectively, as described hereinabove, the height h and the inclination $\theta$ of a plane of the swing of the bat are found. Further, it is obvious that the velocity V can be measured from the interval of time corresponding to the segment $\overline{P_1P_3}$.

FIG. 5 is a diagrammatic representation showing the structure of a signal processing circuit of a swing measuring instrument according to the present invention. Referring to FIG. 5, a clock generator 39 generates clock signals having a frequency of 2 MHz. Output signals from the light receiving elements 20a to 20d are applied to preamplifiers 44 to 47, respectively, which provide outputs to waveform shaping circuits 48 to 51, in which they are compared with a predetermined reference voltage so that they are shaped in waveform into pulse signals. Gates 52 to 57 receive pulse signals from the waveform shaping circuits 48 to 51 to gate clock signals from the clock generator 39. Counter circuits 58 to 60 count clock signals gated from the gate circuits 52 to 57. Using outputs from the counter circuits 58 to 60, the distance d and the height h as data, operations of the formulae (7) to (9) are performed by a digital computer 62 to obtain the height h' and the inclination $\theta$ and the velocity V of the swing, and results of such operations are provided to a display circuit 62 to be displayed thereon.

FIG. 6 illustrates a second embodiment of the present invention and shows a plane defined by four paths of light beams projected to a same plane in a similar manner as shown in FIG. 1, and intersecting points at which the plane intersects with a locus of a swing of a bat.

Referring to FIG. 6, light paths 63 and 64 of beams are spaced apart a distance d from each other and projected in parallel in a vertical direction while paths 65 and 66 of beams are projected at a mutually equal tilt angle $\theta_2$ relative to the paths 63 and 64 from the same (or adjacent) points on a sensor section 5 as those of the paths 63 and 64, respectively. Similarly to the first embodiment as described hereinabove, these four paths 63, 64, 65 and 66 are in a same plane.

Now, it is assumed that the path 65 intersects with the path 64 at a height h on the y axis of the sensor section 5 and coordinates of points from which the beams are projected along the path 64, 63 are expressed as (0, 0), (d, 0) on the sensor section 5, respectively. Then, points $R_1$, $R_2$, $R_3$ and $R_4$ at which the locus 10 intersects with the paths 63, 64, 65 and 66, respectively, have coordinates represented by following representations, respectively:

$$R_1:(d,\ d\tan\theta + h') \tag{10}$$

$$R_2: \left( \frac{h-h'}{\frac{h}{d}+\tan\theta},\ h\frac{\frac{h'}{d}+\tan\theta}{\frac{h}{d}+\tan\theta} \right) \tag{11}$$

$$R_3:(0,\ h') \tag{12}$$

$$R_4: \left( \frac{-h'}{\frac{h}{d}+\tan\theta},\ h\frac{\frac{h'}{d}}{\frac{h}{d}+\tan\theta} \right) \tag{13}$$

Accordingly, a ratio $r_4$ between segments $\overline{R_1R_3}$ and $\overline{R_2R_4}$ and another ratio $r_5$ between segments $\overline{R_2R_3}$ and $\overline{R_3R_4}$ are expressed by following equations (14) and (15), and hence a height h' and an angle $\theta$ of the plane and the velocity V of the swing are calculated with following equations (16) to (18).

$$r_4 = \frac{\overline{R_1R_3}}{\overline{R_2R_4}} \tag{14}$$
$$= 1 + \frac{d}{h}\tan\theta$$

$$r_5 = \frac{\overline{R_2R_3}}{\overline{R_3R_4}} \tag{15}$$
$$= (h - h')/h'$$

$$h' = \frac{1}{r_5 + 1} h \tag{16}$$

$$\theta = \tan^{-1} \frac{h}{d} (r_4 - 1) \tag{17}$$

$$V = d/t_3 \tag{18}$$

Here, $t_3$ is an interval of time which is necessary for the bat to travel between the paths 63 and 64. With respect to the second embodiment, the similar description is given based on the plane geometry as that of the first embodiment. It is apparent however that, a motion of the bat is considered to have a uniform swing velocity. These expressions may also be applicable if a distance of a segment $R_iR_j$ (i, j=1, 2, 3, 4) is simply replaced by a period of time calculated from respective points of time at which the bat intersects with the four beams.

It is to be noted that, although it is not made clear which of the first and second embodiments is superior, for example, which of them is superior in accuracy can be quantitatively distinguished from results of total differentiation of the equation for h', $\theta$ and V in the two embodiments.

Further, while the embodiments which use four beams are described, it goes without saying that a number of the paths of beams to be emitted and received may be increased such that angles, heights and velocities of the swing at the respective beam crossing points can be distinguished, and further coefficients of fluctuation of the velocities between the individual points can be distinguished from these velocities.

While in the description above the examples are described in which a HeNe laser oscillator is employed as a light emitting element, it also goes without saying that the HeNe laser oscillator can be replaced by light emitting diodes of semiconductor element, which emit frequency modulated light beam so as to discriminate between the perceived beams. Further, the present invention can be applied to other uses than a swing measuring element without departing from a spirit and scope of the invention, for example, to a technique for measuring a velocity, inclination and height of a moving body.

What is claimed is:

1. An instrument for measuring the movement of a baseball bat swung by a player, comprising:

an optical system including means for projecting first and second groups of beams of light from at least one light source, said beams being directed upwards and disposed in a plane intersected by the bat during the swing;

light receiving means for receiving beams reflected from a reflective surface of a recurrent reflective material on said bat as said bat intersects said beams;

operational means connected to the output of said light receiving means for calculating physical parameters of the swing of said bat; and indicator means for indicating said parameters calculated by said operational means;

said beams in each of the first and second groups of beams being parallel to and spaced apart from each other, and said beams in said first group being projected at an angle relative to the beams in said second group so that one beam in said first group intersects with one beam in said second group at a predetermined height.

2. An instrument according to claim 1, wherein said operational means includes means for calculating a height and an angle of a plane of motion and a velocity of a motion of said bat, which are calculated by following equations:

$$h' = \frac{h}{r_0 + 1}$$

$$\theta = \tan^{-1}\left(\frac{r_1 - 1}{r_1 + 1} \cdot \frac{h}{d}\right)$$

$$V = d/t_1$$

where
h' is the height of the plane of motion,
$\theta$ is the angle of the plane of motion relative to a horizontal plane, V is a component of a velocity in a horizontal direction, h is the predetermined height of intersection of said one beams in said first and second groups, d is a distance between two points from which two parallel beams of each group are projected from said optical system,
$r_0$ is a ratio between (1) an interval of time between points of time at which said light receiving means receive reflected beams when said bat intersects with two inner converging ones of the beams of said first and second groups of beams and (2) another interval of time between points of time at which said light receiving means receive reflected beams when said bat intersects with two outer diverging ones of the beams of said first and second groups of beams, $r_1$ is a ratio between (1) an interval of time between two points of time at which said bat intersects with two parallel beams of said first group and (2) another interval of time between two points of time at which said bat intersects with two parallel beams of said second group, and $t_1$ is an interval of time between two points of time at which said bat intersects with two parallel beams of said first or second group.

3. An instrument according to claim 1, wherein the spacing between the projection points of the parallel beams of the first group is equal to the spacing between the projection points of the parallel beams of the second group, the parallel beams in the first group are projected vertically from two points spaced apart from each other by the predetermined distance d while the parallel beams in the second group are projected in an inclined relationship to the two beams in said first group.

4. An instrument according to claim 3, wherein said operational means includes means for calculating a height h' and an angle $\theta$ of a plane of motion and a velocity V of motion of said bat in accordance with following three equations:

$$h' = \frac{h}{r_5 + 1}$$

$$\theta = \tan^{-1} \frac{h}{d} (r_4 - 1)$$

$$V = d/t_3$$

where h is the predetermined height of the intersecting point between the one beams of the first and second groups, other beams of said first and second groups projecting obliquely relative to each other, $r_4$ is a ratio between (1) an interval of time between two points of time at which said bat intersects with two beams which are vertical and (2) another interval of time between points of time at which said bat intersects with two beams which are projected in inclined relationship to the vertical beams, $r_5$ is a ratio between (1) an interval of time between points of time at which said bat intersects with one of the vertical beams and intersects with a converging one of the obliquely projecting beams and (2) an interval of time between two points of time at which said bat intersects with one of the vertical beams and a diverging one of the obliquely projecting beams, and $t_3$ is an interval of time between points of time at which said bat intersects with the two beams which are vertical to said light receiving means.

5. An instrument according to claim 1, wherein said light source comprises a helium-neon laser beam oscillator having a mixture gas of helium and neon gas as an active material.

6. An instrument according to claim 1, wherein said light source comprises a plurality of light emitting diodes.

7. An instrument according to claim 6, wherein outputs of said light emitting diodes are modulated with a frequency.

8. An instrument as claimed in claim 1 including a sensor section including the optical system wherein the projecting means includes a linear horizontal array of light projecting points with the distance between the first and last projecting points being about equal to the length of a baseball home plate.

* * * * *